United States Patent [19]

Takase

[11] Patent Number: 5,249,068

[45] Date of Patent: Sep. 28, 1993

[54] IMAGE READING APPARATUS

[75] Inventor: Osamu Takase, Yokohama, Japan

[73] Assignee: Ricoh Company, Ltd., Tokyo, Japan

[21] Appl. No.: 631,912

[22] Filed: Dec. 21, 1990

[30] Foreign Application Priority Data

Dec. 25, 1989 [JP] Japan ................................. 1-335277

[51] Int. Cl.$^5$ ............................................. H04N 1/40
[52] U.S. Cl. .................................. 358/461; 358/464; 358/471; 358/475
[58] Field of Search ............... 358/461, 464, 471, 445, 358/446, 463, 465, 496, 475

[56] References Cited

U.S. PATENT DOCUMENTS

| | | | |
|---|---|---|---|
| 4,660,082 | 4/1987 | Tomohisa et al. | 358/406 |
| 4,829,379 | 5/1989 | Takaki | 358/461 |
| 4,868,685 | 9/1989 | Ueno | 358/461 |
| 4,870,501 | 9/1989 | Yoshida | 358/461 |
| 4,916,549 | 4/1990 | Sekizawa | 358/461 |
| 4,989,100 | 1/1991 | Ishima | 358/461 |
| 5,062,144 | 10/1991 | Murakami | 358/461 |
| 5,070,414 | 12/1991 | Tsutsumi | 358/461 |
| 5,099,341 | 3/1992 | Nosaki et al. | 358/461 |
| 5,101,281 | 3/1992 | Ishima | 358/461 |
| 5,105,286 | 4/1992 | Sakurai | 358/461 |
| 5,146,351 | 9/1992 | Maehara | 358/461 |
| 5,157,518 | 10/1992 | Ohtaki et al. | 358/461 |

Primary Examiner—Edward L. Coles, Sr.
Assistant Examiner—Fan Lee
Attorney, Agent, or Firm—Oblon, Spivak, McClelland, Maier & Neustadt

[57] ABSTRACT

An image reading apparatus having a line sensor for supplying an image signal in accordance with a brightness of a specified region of an original document along a main scan line, the line sensor having a plurality of photoelectric conversion elements aligned along a main scan line. The image reading apparatus comprises a sampling part for sampling and holding a level of a reference signal initially outputted by the line sensor when a reference board is scanned, a correction part for calculating a correction quantity according to a level of a signal outputted by the photoelectric conversion elements when the specified region of the original document is scanned, a subtraction part for subtracting the correction quantity from the level of the reference signal when the reference board is scanned, to supply a corrected reference signal according to the brightness of the specified region of the original document, and a normalization part for normalizing a level of an image signal outputted by the photoelectric conversion elements when the original document is scanned, based on a level of the corrected reference signal from the subtraction part.

9 Claims, 4 Drawing Sheets

IMAGE READING APPARATUS

BACKGROUND OF THE INVENTION

The present invention generally relates to an image reading apparatus, and more particularly to an image reading apparatus, including a digital copier, a facsimile and an image file apparatus, which can output an image signal in accordance with a brightness of a specified region of an original document.

Generally, an image reading apparatus uses a line sensor having a number of photoelectric conversion elements (for example, charge coupled devices) for reading an image of each original document. A number of photoelectric conversion elements are aligned in the line sensor along a main scan line to achieve a resolution equivalent to some lines per 1 millimeter or some tens of lines per 1 millimeter for each line of data that the line sensor supplies. To read two-dimensional image information of an original document by the image reading apparatus, a main scan is made by scanning of an optical lighting part in a main scanning direction, and, in conjunction with the main scan, a sub scan is made by transporting the original document by one pitch in relation to the line sensor in a sub scanning direction perpendicular to the main scanning direction. Such an image reading apparatus is disclosed, for example, in Japanese Laid-Open Patent Application No. 62-235872. Conventionally, however, there is a problem in that the conventional image reading apparatus often experiences undesired variations of an output level of an image signal supplied when the image of the same original document is read. In such image reading apparatus, the output level of the image signal supplied when the image of an original document is read varies, due to a change in illuminance of light which is supplied by the optical lighting part to a surface of the original document, even when the same original document is read by the image reading apparatus.

This problem is caused primarily because the image signal actually outputted from the photoelectric conversion elements is a reflectance (or, brightness of a region of an original document) multiplied by the illuminance of light supplied by the optical lighting part. As a measure for eliminating this problem, a reference white board is provided outside an effective image reading region of the line sensor along the main scan line. An output signal as a reference signal is obtained by the line sensor from this reference white board outside the effective image reading region, and this reference signal is used for normalizing a level of an image signal obtained from an image of an original document within the effective image reading region by the line sensor, which is based on the reference signal. The image reading apparatus therefore can supply an image signal indicative of the actual brightness of the image of the original document, even when the illuminance of light supplied from the optical lighting part varies.

There is another cause of the above undesired variations of the output level of an image signal supplied when an original document is scanned. This cause of the undesired variations of the output level of the image signal is the relative brightness of a specified region of the original document relative to a brightness of a reference white board. The reference white board as described above is provided at an end portion of the main scan line which is adjacent to the specified region of an original document in the image reading apparatus for the purpose of eliminating the former problem, but, a level of the reference signal obtained from the reference white board is significantly varied depending on the relative brightness of a specified region of an original document. That is, the level of the reference signal varies depending on what kind of original documents are read, and the level of an image signal outputted is undesirably varied even when the same original document is read. For example, in a case where a small black region of an original document (image data) is surrounded by a large white region within the original document, the area of the large white region being much greater than that of the small black region, a level of an image signal slightly higher than the actual signal level is produced from such a small black region. And, in a case where a small white region within an original document is surrounded by a large black region of the same, a level of the resulting image signal when the original document is read by the image reading apparatus which is slightly darker than the actual signal level is produced with the small white region. For this reason, the level of the reference signal obtained from the reference white board is sometimes varied depending on the level of brightness of a surrounding region of the reference white board. A major cause of this problem is a recurring reflection of light supplied by the optical lighting part to a surface of the original document. This light from the optical lighting part is repeatedly reflected between the surface of the original document and a surface of the optical lighting part. In this manner, the output level of an image signal when the original document is scanned along the main scan line varies due to the variation of the level of the reference signal obtained from the reference white board. In a case where a certain kind of an original document is read by the image reading apparatus, the image reading apparatus does not supply an accurate level of an image signal from each original document, because the level of the reference signal from the reference white board is unsuitably varied depending on the relative brightness of a specified region of each original document relative to the brightness of the reference white board. In the conventional image reading apparatus, it is therefore difficult to always supply an accurate level of an image signal from original documents, regardless of what kind of original documents is inputted to the conventional image reading apparatus.

SUMMARY OF THE INVENTION

Accordingly, it is a general object of the present invention to provide an improved image reading apparatus in which the above described problems are eliminated.

Another and more specific object of the present invention is to provide an image reading apparatus having a line sensor for generating an image signal when a main scan is made on an image of an original document along a main scan line, the line sensor having a number of photoelectric conversion elements aligned along the main scan line for supplying the image signal from the image of the original document in accordance with a brightness of a specified region of the original document along the main scan line, the image reading apparatus comprising a sampling part for sampling and holding a level of a reference signal outputted by the line sensor when a reference board is scanned along the main scan line, the reference board provided at an end of the main scan line, a correction part for calculating a correction quantity in accordance with a level of a signal outputted by the photoelectric conversion elements when the specified region of the original document adjacent to the reference board is scanned along the main scan line, the level of the signal indicating the brightness of the specified region of the original document, a subtraction part for subtracting the correction quantity supplied by the correction part from the level of the reference signal supplied from the sampling part after the reference board is scanned along the main scan line, so that a corrected reference signal in accordance with the brightness of the specified region of the original document is supplied, and a normalization part for normalizing a level of an image signal outputted by the photoelectric conversion elements when the original document is scanned along the main scan line, based on a level of said corrected reference signal supplied from the subtraction part. According to the present invention, it is possible to set up a corrected output level of a reference signal from the reference white board that is not dependent on and not influenced by the brightness of a specified region of the original document adjacent to the reference white board, thereby achieving accurate reading of an image of the original document based on the corrected output level of the reference signal from the reference white board.

Still another object of the present invention is to provide an image reading apparatus which comprises a sensing part for generating a signal when a main scan is made on an image of an original along a main scan line, the sensing part having a plurality of photoelectric conversion elements aligned along the main scan line for supplying an image signal from the image of the original in accordance with a brightness of a specified region of the original along the main scan line, a sampling part for sampling and holding a level of a signal outputted by the sensing part when a reference board provided at an end of the main scan line is scanned, a correction part for calculating a correction quantity in accordance with a level of a signal outputted by the photoelectric conversion elements when the specified region of the original adjacent to the reference board is scanned along the main scan line, the level of the signal indicating the brightness of the specified region of the original, a subtraction part for subtracting the correction quantity supplied by the correction part from the level of the reference signal supplied from the sampling part after the reference board is scanned along the main scan line, so that a corrected reference signal in accordance with the brightness of the specified region of the original is supplied, and a normalization part for normalizing a level of an image signal supplied by the photoelectric conversion elements when a main scan is made on the image of the original along the main scan line, based on a level of the corrected reference signal supplied from the subtraction part, wherein the correction part comprises a multiplier, an accumulator and a memory, the multiplier provided for multiplying a brightness of each specified point within the specified region of the original by a weight factor which is predetermined to be in accordance with a distance of each the specified point from the reference board along the main scan line, the brightness of each the specified point being indicated by a level of a signal supplied by the sensing part when the specified region of the original is scanned, the accumulator provided for accumulating the thus obtained brightnesses of the specified points within the specified region of the original to determine the correction factor, each brightness of each the specified point being multiplied by the weight factor by the multiplier, the correction part thus supplying the correction factor to the subtraction part, the correction factor being determined based on the brightness of the specified region of the original adjacent to the reference board, the memory provided for storing a set of weight factors which are predetermined based on a prescribed distribution function representing each value of the weight factors which is variable as a function of the distance of each of the specified points from the reference board along the main scan line. According to the present invention, it is possible for the image reading apparatus to supply an accurate level of an image signal regardless of the relative brightness of a specified region of an original document, because the level of a reference signal obtained from the reference white board is corrected to a level in accordance with the relative brightness of the specified region of that original document. Therefore the level of the reference signal is not dependent on the relative brightness of the specified region of the original document which is very likely to influence the level of the reference signal obtained from the reference white board.

Other objects and further feature of the present invention will become apparent from the following detailed description when read in conjunction with the accompanying drawings.

DESCRIPTION OF THE PREFERRED EMBODIMENTS

A description will now be given of a first embodiment of an image reading apparatus according to the present invention, with reference to FIGS. 1 through 5. According to the present invention, an accurate output level of each original document can be obtained with the image reading apparatus by correcting an output level of the reference white board in accordance with output levels at specified points within a specified region of an effective image reading region for the original document, the output levels influencing the reading level of the reference white board. The output levels obtained at the specified points within the specified region influence the reading level of the reference white board. A weight factor that is in accordance with the degree of influence on the reading level of the specified region of the original document is assigned to an output level of such a specified point within the specified region, each output level at each point within the specified region being multiplied by the weight factor, and such output levels which are each multiplied by the weight factor are accumulated to determine a correction factor. An accurate reading level of the reference white board can be obtained by reducing the correction quantity from the initial reading level of the reference white board.

An initial reading level $y_i$ obtained by the line sensor 1 from the reference white board, and the output levels $y_i, y_{i+1}, \ldots, y_{i+m}$ at several points within the specified region which influence the initial reading level of the reference white board can be represented by the following formula:

$$y_i = x_i + a_{j-i}x_j + a_{j-i+1}x_{j+1} + \ldots + a_{j-i+m}x_{j+m} \quad (1)$$

where, $x_k$ is the true reading level at a specified point "k" within the specified region when the reference white board is read in an ideal condition with no recurring reflection light, and $a_k$ is a weight factor according to the degree of influences on the initial reading level at that point "k".

The true reading level $x_i$ of the reference white board which should be obtained from the reference white board regardless of whether the brightness of part of an original document varies is as follows:

$$x_i = y_i - (a_{j-i}x_j + a_{j-i+1}x_{j+1} + \ldots \\ + a_{j-i+m}x_{j+m}) = y_i - K \quad (2)$$

In this case, the true reading levels $x_j$ through $x_{j+m}$ at points $a_j$ through $a_{j+m}$ are not available, but it can be said that these true reading levels $x_j$ through $x_{j+m}$ are approximate to the output levels $y_j$ through $y_{j+m}$, respectively, by assuming that the correction quantity K is not so great in comparison with the initial reading level $y_i$ of the reference white board. Therefore, the true reading level $x_i$ of the reference white board can be obtained by the following formula:

$$x_i = y_i - (a_{j-i}y_j + a_{j-i+1}y_{j+1} + \ldots + a_{j-i+m}y_{j+m}) \quad (3)$$

Figure 1:
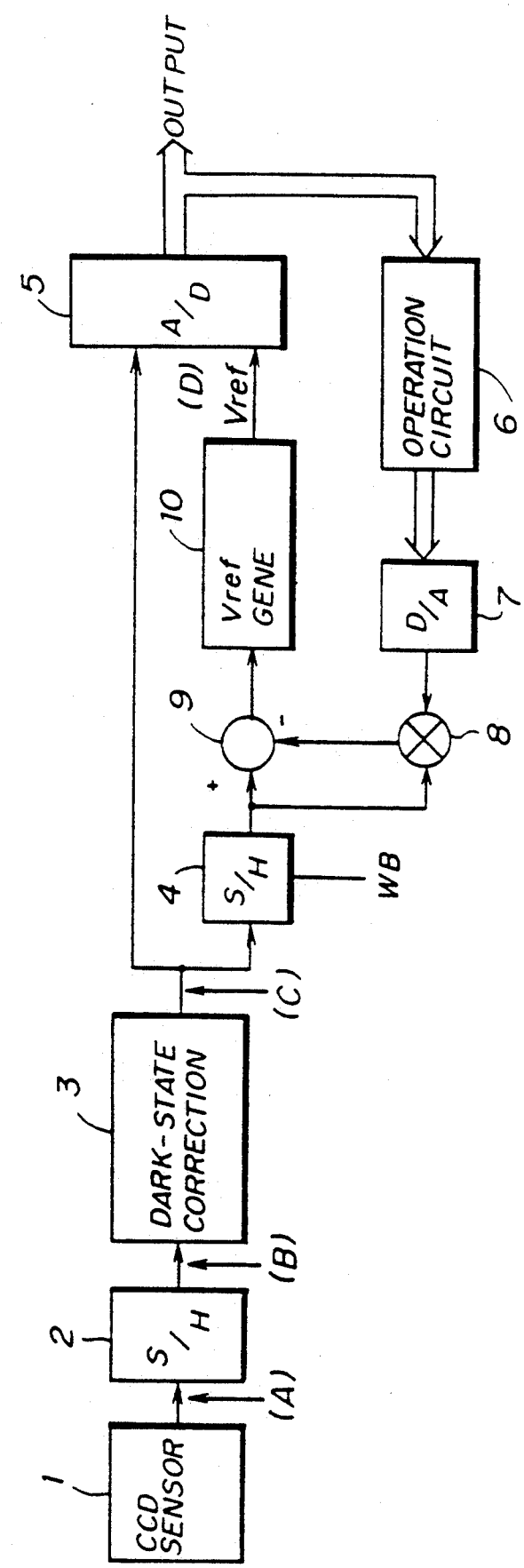
FIG. 1 is a block chart showing the construction of a first embodiment of an image reading apparatus according, to the present invention.

FIG. 1 shows the construction of an image reading apparatus according to the present invention. In this image reading apparatus, a line sensor 1 having an array of charge coupled devices (CCD) aligned along a main scan line along which a main scan is made by an optical lighting part over a surface of an original document in a main scanning direction, a sampling/holding circuit 2, a dark-state correction circuit 3 and a major circuit part of the present invention are provided, this major circuit part being the important part of the image reading apparatus according to the first embodiment of the present invention. An output from the line sensor 1 is processed by the sampling/holding circuit 2 and by the dark-state correction circuit 3, and an output from the dark-state correction circuit 3 is supplied to two different points of the major circuit part simultaneously. The major circuit part in this embodiment generally has a sampling/holding circuit 4, an analog-to-digital (A/D) converter 5, an operation circuit 6, a digital-to-analog (D/A) converter 7, a multiplier 8, a subtracter 9 and a reference voltage generating amplifier 10.

As shown in FIG. 1, the output from the dark-state correction circuit 3 is supplied to the sampling/holding circuit 4 and at the same time to the A/D converter 5. The sampling/holding circuit 4 performs a sampling and holding of a signal processed by the dark-state correction circuit 3, and supplies an output to the multiplier 8 and to the subtracter 9, this output being indicative of the initial reading level of the reference white board. The A/D converter 5 performs a normalization of a signal from the dark-state correction circuit 3 and supplies a normalized signal to a shading correction part (not shown) and to the operation circuit 6. The signal supplied to the operation circuit 6 is processed by the operation circuit 6 to determine a reading level at a point within the specified region in the original document. The operation circuit 6 supplies a digital signal indicative of the reading level at that point within the specified region t the D/A converter 7, and this D/A converter 7 supplies an analog signal, which the digital signal has been converted into, to the multiplier 8. In the multiplier 8, the analog signal from the D/A converter 7 is multiplied by the output from the sampling/holding circuit 4. Thus, a signal indicative of the value of the correction quantity is supplied from the multiplier 8 to the subtracter 9, and, in this subtracter 9, the correction quantity indicated by the signal from the multiplier 8 is subtracted from the initial reading level of the reference white board indicated by the signal from the sampling/holding circuit 4. An output from the subtracter 9 is supplied to the A/D converter 5 via the reference voltage generating amplifier 10.

The line sensor 1 shown in FIG. 1 outputs a signal indicative of image information of the original document for one main scan to the sampling/holding circuit 2, this signal having a waveform as shown in FIG. 2A. In FIG. 2A, "DS" indicates a waveform of a dark-state signal outputted by a dummy photoelectric conversion element which is optically shielded and provided within the line sensor 1 for correcting a dark-state output level of a signal from the line sensor 1. This signal DS outputted by the dummy photoelectric conversion element has minute levels as shown in FIG. 2A. And, "WB" indicates a waveform of a signal outputted by the photoelectric conversion elements when reading the reference white board provided outside an effective image reading range of an original document. After the reference white board is scanned, the effective image reading range of the original document is scanned by the line sensor 1, and a signal covering one main scan is supplied by the line sensor 1 to the sampling/holding circuit 2. The sampling/holding circuit 2 performs a sampling and holding to remove a CCD transfer clock signal from the signal supplied from the line sensor 1, and outputs a signal having a waveform as shown in FIG. 2B, this signal being supplied to the dark-state correction circuit 3. The dark-state correction circuit 3 corrects the signal DS from the dummy photoelectric conversion element and supplies a signal having a waveform shown in FIG. 2C. This signal supplied from the dark-state correction circuit 3 has an inverted polarity when compared with a polarity of the signal shown in FIG. 2B. The signal is supplied from the dark-state correction circuit 3 to the A/D converter 5 and simultaneously to the sampling/holding circuit 4 for a WB period corresponding to a period of time while the reference white board is being read by the photoelectric conversion elements. The sampling/holding circuit 4 performs a sampling and holding of the signal during the WB period and supplies a resulting signal to the subtracter circuit 9, and this subtracter circuit 9 subtracts a correction quantity from the signal supplied from the sampling/holding circuit 4. The amount of correction indicated by a signal supplied from the multiplier circuit 8 will be described below. A signal from which the amount of correction is subtracted is supplied to the reference voltage generating amplifier 10, and this signal is amplified by a given amplification factor. And a signal indicative of a reference voltage Vref as shown in FIG. 2D is supplied from the reference voltage generating amplifier 10 to the A/D converter 5. This reference voltage Vref is used as a new reference voltage. Generally, a signal obtained with the optical lighting part, which signal includes a shading and a level corresponding to an end portion of the reference white board, is usually lower than the level of the signal corresponding to the central portion of the reference white board. Accordingly, a signal obtained when the reference white board provided adjacent to an end portion of the effective image reading range is scanned, has an output level which is lower than a level of a signal obtained from a central portion of the effective image reading range. The reference voltage generating amplifier 10 is therefore provided to adjust such a lower level of the signal to match the peak level of a signal supplied from the circuit 3 to the A/D converter 5. If the reference voltage Vref supplied to the A/D converter 5 is set to the maximum level of an analog signal inputted to the A/D converter 5, it is possible for the A/D converter 5 to quantize all the analog signals inputted within a wide range of the digital signals expected. As the illuminance of light by the optical lighting part varies, the level of a signal outputted from the line sensor 1 varies, but, in response to the change of the signal from the line sensor 1, the reference voltage Vref varies depending on the level of the signal outputted from the line sensor 1, thus the signal outputted from the A/D converter 5 shows only a negligible variation. Thus, it is possible to determine an accurate reading level of the original document (brightness or reflectance of the original document), regardless of whether the illuminance of light by the optical lighting part varies. A signal from the A/D converter 5 is supplied to the shading correction part (not shown), and the shading correction part removes a shading from the signal supplied from the A/D converter 5.

Figure 2:
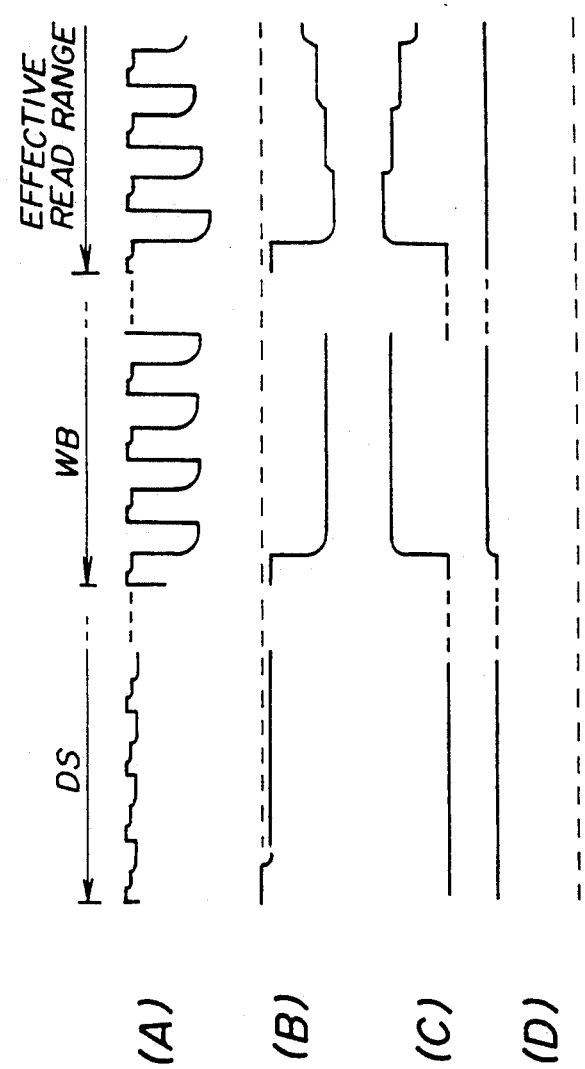
FIGS. 2A through 2D are diagrams showing a waveform of an output signal at several points within the image reading apparatus of FIG. 1.
Figure 3:
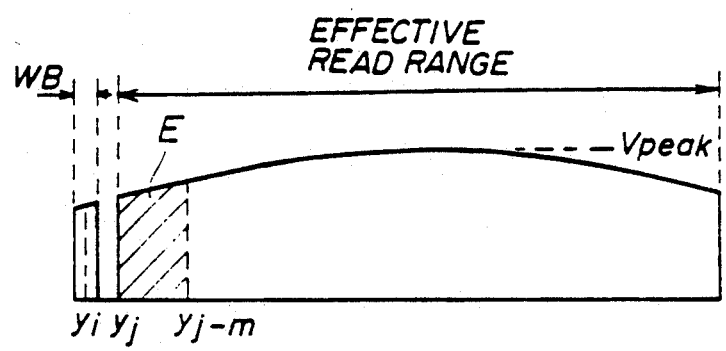
FIG. 3 is a chart showing an example of an output level of a signal supplied by the image reading apparatus of FIG. 1 when a main scan is made.

Next, a description will be given of a generating procedure to generate a correction quantity which is defined by a signal supplied from the operation circuit 6 to the subtracter 9 via the D/A converter 7 and the multiplier 8. A level of a signal initially outputted from the sampling/holding circuit 4 to the subtracter 9 when the reference white board is scanned along the main scan line for a time period corresponding to the WB period indicated in FIG. 2 is significantly influenced by a level of signal obtained from the original document when the specified region within the effective image reading range adjacent to the reference white board is scanned along the main scan line. This is primarily because there is a recurring reflection of light supplied by the optical lighting part as described above. The recurring reflection of light is a phenomenon in which a light is reflected on a surface of an original document and returned back to the optical lighting part, and such light is again reflected on the surface of the original document. In other words, as shown in FIG. 3, an initial reading level $y_i$ of the reference white board for the WB period is significantly influenced by the reading levels $y_j$ through $y_{j+m}$ of the original document at specified points "j" through "j+m" within the specified region E as indicated by shading lines in FIG. 3, which region is located adjacent to the reference white board. Therefore, the true reading level $x_i$ of the reference white board for the WB period is determined by the formula (3) above, in which the correction quantity K is subtracted from the initial reading level $y_i$ of the reference white board. The A/D converter 5 outputs a digital signal indicative of any of the reading levels $y_j$ through $y_{j+m}$ to the operation circuit 6, and the operation circuit 6 multiplies respectively the reading levels $y_j$ through $y_{j+m}$ by weight factors $a_{j-i}$ through $a_{j-i+m}$ then the operation circuit 6 accumulates the resultant products to determine a correction quantity K. A digital signal indicative of the correction quantity K from the operation circuit 6 is supplied to the D/A converter 7, this D/A converter 7 supplying an analog signal, which the digital signal is converted into, to the multiplier 8. This analog signal is multiplied by the multiplier 8 by each output level from the reference white board before the correction is made, this signal being processed in accordance with the illuminance of light supplied from the optical lighting part. A signal indicative of the correction quantity K is supplied to the subtracter 9, this correction quantity K being subtracted from the output signal supplied by the sampling/holding circuit 4 for the WB period.

When the illuminance of light supplied from the optical lighting part does not varies, the reference voltage Vref according to the corrected reading level is constant. That is, the initial reading level $y_i$ for the WB period varies depending on the brightness of the original document, but the corrected reading level $x_i$ for the WB period can be obtained regardless of the brightness of the original document indicated by the reading levels $y_j$ through $y_{j+m}$, as is apparent from the formula (1) above. When the illuminance of light supplied from the optical lighting part varies, the reference voltage Vref varies depending on the change in illumination of the light, which is similar to the case in which the above correction is not made. However, the output from the A/D converter 5 remains unchanged.

Figure 4A:
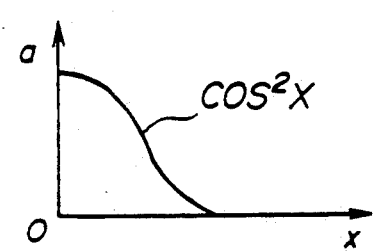
FIGS. 4A and 4B are charts showing examples of distribution functions that can be used to represent weight factors for calculating the correction quantity to correct the initial output level from the reference white board.
Figure 4B:
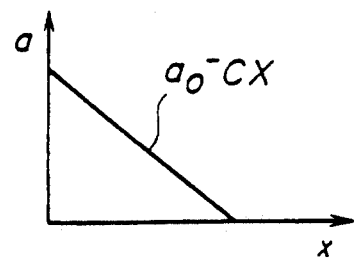

FIGS. 4A and 4B show examples of a distribution function of the weight factors $a_{j-i}$ through $a_{j-i+m}$ which can be used for correction of the reading level. These examples of the distribution function are used instead of a distribution function showing the actual degrees of influence on the reading level from the reference white board. FIG. 4A shows a distribution curve ($a = \cos^2 x$) which indicates the distribution of the weight factors $a_{j-i}$ through $a_{j-i+m}$, and this curve can easily match the above actual distribution function. FIG. 4B shows a linear chart ($a = a_0 - c\, x$) which approximately shows the above distribution function showing the actual degrees of influence, and when this linear chart is used, the related components may be constructed into a simple design. In addition, there are other distribution functions, which are, for example, a Gaussian distribution (or, a normal distribution) that may be used for the correction of the reading levels, and an optimized function that may also be used, in which the distribution function is determined through actual measurements of the degrees of influences on the initial reading level of the reference white board at several specified points within the specified region of the effective image reading range for the original document.

Figure 5:
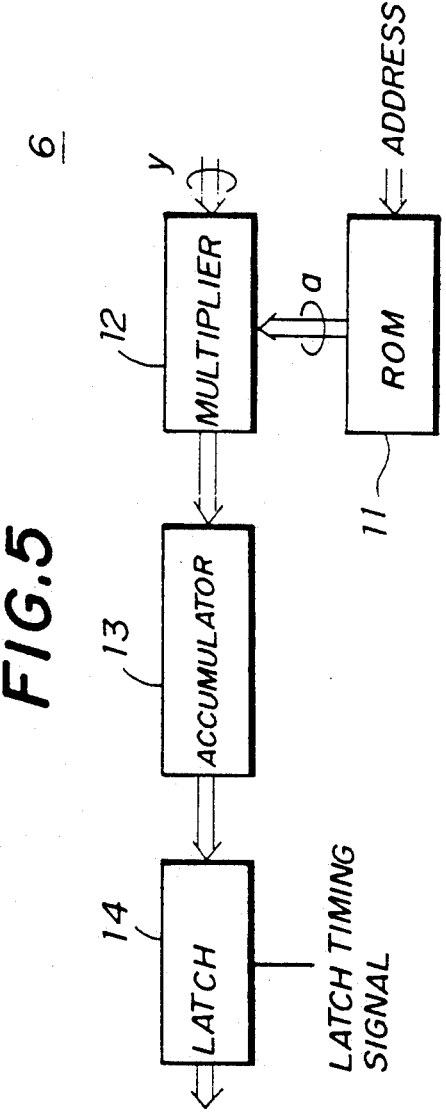
FIG. 5 is a block diagram showing an example of an operation circuit provided in the image reading apparatus.

FIG. 5 shows the construction of the operation circuit 6 provided in the image reading apparatus according to the present invention. This operation circuit 6 generally has a read only memory (ROM) 11, a multiplier 12, an accumulator 13 and a latch circuit 14. The ROM 11 is provided for storing the values of the weight factors $a_{j-i}$ to $a_{j-i+m}$, and these weight factors stored in the ROM 11 are supplied to the multiplier 12 sequentially by renewing address inputs. The multiplier 12 multiplies the reading levels $y_j$ through $y_{j+m}$ by the weight factors $a_{j-i}$ to $a_{j-i+m}$, respectively, and the accumulator 13 accumulates these products supplied from the multiplier 12. By a latch timing signal which is generated at an appropriate time after the accumulation is completed, a signal indicative of the accumulated value is supplied from the accumulator 13 to the latch circuit 14. An output from the accumulator 14 is supplied to the D/A converter 7.

Figure 6:
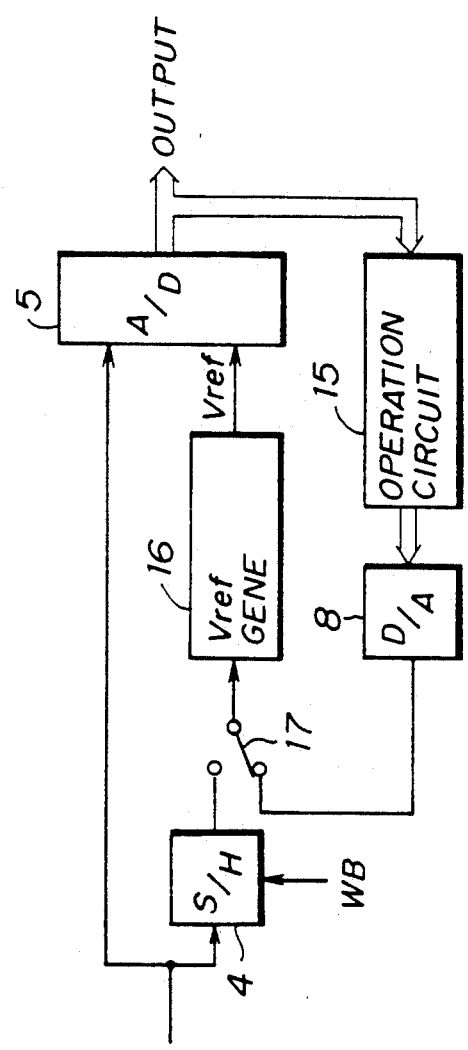
FIG. 6 is a block diagram showing the construction of a second embodiment of an image reading apparatus according to the present invention.

Next, a description will be given of a second embodiment of an image reading apparatus according to the present invention, with reference to FIG. 6. In FIG. 6, those parts which are the same as those corresponding parts of the first embodiment in FIG. 1 are designated by the same reference numerals, and a description thereof will be omitted. Also, the parts other than the major circuit part of the image reading apparatus as shown in FIG. 1 are omitted from the second embodiment shown in FIG. 6. In this second embodiment, an operation circuit 15 is used in place of the operation circuit in the first embodiment shown in FIG. 1, a reference voltage generating amplifier 16 is used in place of the reference voltage generating amplifier 10, and a switching circuit 17 is used in place of the multiplier 8 and the subtracter 9. This operation circuit 15 not only calculates the correction quantity K but also performs subtraction of the correction quantity from the initial reading level of the reference white board. The switching circuit 17 is switched to a first position only when a initial value of the reference voltage Vref is supplied to the A/D converter 5. When the switching circuit 17 is switched to the first position, the sampling/holding circuit 4 is connected directly to the reference voltage generating amplifier 16 so that an initial value of the reference voltage Vref is supplied to the A/D converter 5. In this case, the supplying of the initial value of the reference voltage Vref to the A/D converter 5 is required only for a first main scan or some first main scans made by the optical lighting part along the main scan line. According to this second embodiment, it is also possible to set up a constant level of a reference signal with the reference white board which is not dependent on the brightness of the specified region of an original document, thereby achieving accurate reading of an image of the original document Further, the present invention is not limited to these embodiments, and variations and modifications may be made without departing from the scope of the present invention.

What is claimed is:

1. An image reading apparatus which has a line sensor for generating a signal when a main scan is made on an image of an original along a main scan line, the line sensor having a plurality of photoelectric conversion elements aligned along the main scan line for supplying an image signal from the image of the original in accordance with a brightness of a specified region of the original along the main scan line, the image reading apparatus comprising:

sampling means for sampling and holding a level of a signal outputted by the line sensor when a reference board provided at an end of the main scan line is scanned;

correction means for calculating a correction quantity in accordance with a level of a signal outputted by the photoelectric conversion elements when the specified region of the original adjacent to the reference board is scanned along the main scan line, said level of said signal indicating the brightness of the specified region of the original;

subtraction means for subtracting the correction quantity supplied by the correction means from the level of the reference signal supplied from the sampling means after the reference board is scanned along the main scan line, so that a corrected reference signal in accordance with the brightness of the specified region of the original is supplied; and normalization means for normalizing a level of an image signal supplied by the photoelectric conversion elements when a main scan is made on the image of the original along the main scan line, based on a level of said corrected reference signal supplied from the subtraction means.

2. The apparatus as claimed in claim 1, wherein the correction means comprises a multiplier for multiplying a brightness of each specified points within the specified region of the original by a weight factor which is predetermined to be in accordance with a distance of each said specified point from a position of the reference board along the main scan line, said brightness of each said specified point indicated by a level of a signal supplied by the line sensor when the specified region of the original is scanned.

3. The apparatus as claimed in claim 2, wherein the correction means comprises an accumulator for accumulating the thus obtained brightnesses of the specified points within the specified region of the original to determine said correction quantity, each brightness of each said specified point being multiplied by said weight factor by the multiplier, the correction means thus supplying said correction quantity to the subtraction means, said correction quantity being in accordance with the brightness of the specified region of the original adjacent to the reference board.

4. The apparatus as claimed in claim 3, wherein the correction means further comprises a memory for storing a set of weight factors $a_{j-1}$ through $a_{-1+m}$, of specified points j through j+m, which are predetermined based on a prescribed distribution function $a = \cos^2 x$ representing each value of said weight factors which is variable as a function of the distance x of each of the specified points j through j+m from a position of the reference board along the main scan line.

5. The apparatus as claimed in claim 4, wherein said multiplier respectively multiples brightnesses $y_j$ through $y_{j+m}$ of the specified points j through j+m by the weight factors $a_{j-1}$ through $a_{j-i+m}$, respectively, which are stored in said memory, and said accumulator accumulates the thus obtained brightnesses which are each multiplied by said weight factor to determine a correction quantity $K = (a_{j-i}y_i + a_{j-i+1}y_{i+1} + \ldots + a_{j-1+m}y_{j+m})$, said correction means thus supplying the correction quantity K to the subtraction means.

6. The apparatus as claimed in claim 2, wherein the correction means comprises a memory for storing a set of weight factors which are predetermined based on a prescribed distribution function representing each value of the weight factors which is variable as a function of the distance of each of the specified points from a position of the reference board along the main scan line.

7. The apparatus as claimed in claim 1, wherein said plurality of photoelectric conversion elements within the line sensor include at least one photoelectric conversion element which is provided for supplying a reference signal when the reference board is scanned along the main scan line.

8. The apparatus as claimed in claim 1, wherein the subtraction means supplies a level of a corrected reference signal to the normalization means, said level of said corrected reference signal being indicative of a true brightness $x_i$ which is determined by subtracting the correction quantity K supplied by the correction means from a brightness $y_i$ of the reference board indicated by a level of a signal outputted by a photoelectric conversion element of the line sensor when the reference board is scanned along the main scan line.

9. An image reading apparatus comprising:
sensing means for generating a signal when a main scan is made on an image of an original along a main scan line, the sensing means having a plurality of photoelectric conversion elements aligned along the main scan line for supplying an image signal from the image of the original in accordance with a brightness of a specified region of the original along the main scan line;
sampling means for sampling and holding a level of a reference signal outputted by the line sensor when a reference board provided at an end of the main scan is scanned;
correction means for calculating a correction quantity in accordance with a level of a signal outputted by the photoelectric conversion elements when the specified region of the original adjacent to the reference board is scanned along the main scan line, said level of said signal indicating the brightness of the specified region of the original;
subtraction means for subtracting the correction quantity calculated by the correction means from the level of the reference signal of the sampling means after the reference board is scanned along the main scan line, so that a corrected reference signal in accordance with the brightness of the specified region of the original is supplied; and
normalization means for normalizing a level of an image signal supplied by the photoelectric conversion elements when a main scan is made on the image of the original along the main scan line, based on a level of said corrected reference signal supplied from the subtraction means,
wherein the correction means comprises a multiplier, an accumulator and a memory, said multiplier multiplying a brightness of each specified point within the specified region of the original by a weight factor which is predetermined to be in accordance with a distance of each said specified point from the reference board along the main scan line, said brightness of said each specified point being indicated by a level of a signal supplied by the sensing means when the specified region of the original is scanned, said accumulator accumulating the thus obtained brightnesses of the specified points within the specified region of the original to determine said correction quantity, each brightness of said each specified point being multiplied by said weight factor by the multiplier, the correction means thus supplying said correction quantity to the subtraction means, said correction quantity being determined based on the brightness of the specified region of the original adjacent to the reference board, said memory storing a set of weight factors which are predetermined based on a prescribed distribution function representing each value of the weight factors which is variable as a function of the distance of said each specified point from the reference board along the main scan line.

* * * * *